United States Patent [19]

Paptzun et al.

[11] 4,201,365
[45] May 6, 1980

[54] LINED GATE VALVE HAVING IMPROVED SEAT

[75] Inventors: George J. Paptzun, Portland; Collin C. Hall, Oregon City; Benjamin B. Bullwinkle, Portland, all of Oreg.

[73] Assignee: International Telephone and Telegraph Corporation, New York, N.Y.

[21] Appl. No.: 887,180

[22] Filed: Mar. 16, 1978

[51] Int. Cl.² ............................................. F16K 3/30
[52] U.S. Cl. ................................... 251/328; 251/326; 251/358
[58] Field of Search .............. 251/328, 326, 360, 358

[56] References Cited
U.S. PATENT DOCUMENTS

| 2,893,684 | 7/1959 | Williams et al. | 251/328 X |
| 2,942,841 | 6/1960 | Stillwagon | 251/326 X |
| 3,207,471 | 9/1965 | Williams | 251/328 |
| 3,212,753 | 10/1965 | Milette | 251/328 X |
| 3,561,727 | 2/1971 | Scaramucci | 251/328 X |
| 4,007,911 | 2/1977 | Clarkson | 251/326 X |

*Primary Examiner*—Arnold Rosenthal
*Attorney, Agent, or Firm*—A. Donald Stolzy

[57] ABSTRACT

A lined gate valve having a seat proportioned such that the ratio of the unit bearing stress to the unit shear stress is substantially 0.68. In one form of the valve, the seat comprises a plastic ring having an embedded metal band. The seat is removable and is held in place by the end pressure of a pipe flange. The seat can be removed by tapping against the seat in an axially outward direction. In another form of the valve, the seat is integral but has the same proportions as above recited.

8 Claims, 6 Drawing Figures

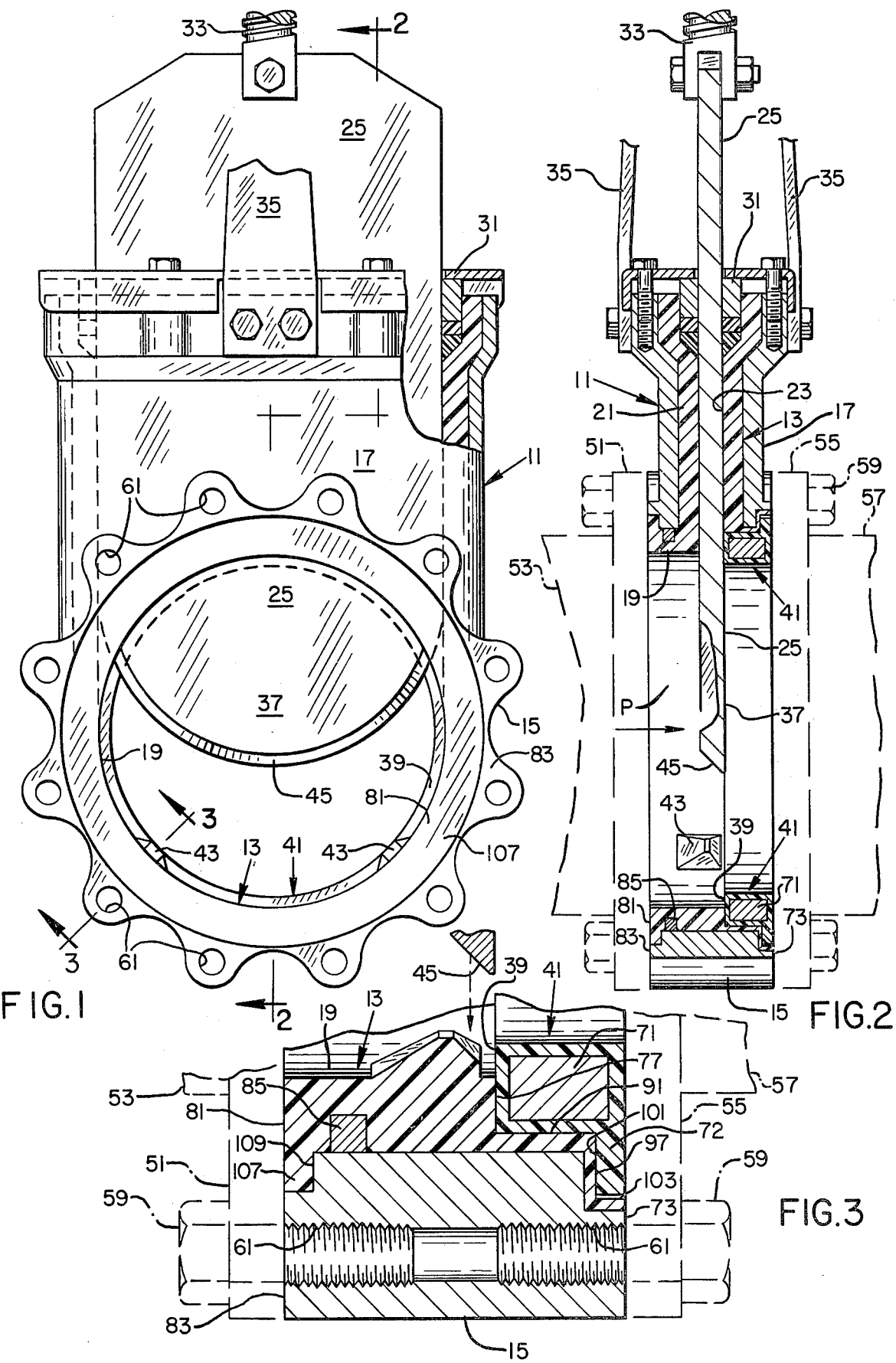

LINED GATE VALVE HAVING IMPROVED SEAT

FIELD OF THE INVENTION

The present invention relates to gate valves lined with a resilient material such as by way of example, urethane. Such resilient material will hereinafter be called plastic.

BACKGROUND OF THE INVENTION

Problems are frequently encountered during and after seating of the gate of a lined gate valve, because the plastic seat, being compressible, is deformed unsymmetrically or excessively. This means that the gate will not form an effective seal with its seat, or the seat may be damaged, or both. It is also desirable that the plastic seat have long wearing life, but while making the seat very thick might solve this problem, we have found that mere thickness will not solve the problem of unsymmetrical distortion and thus leakage at substantial pressures.

SUMMARY OF THE INVENTION

We have discovered that the advantages of (1) providing an effective seal at shut-off conditions, (2) attaining long wearing life, and (3) producing an economic lined valve, can be achieved by proportioning the seat so that the ratio of the unit bearing stress over the unit shear stress at the seat is 0.68 or approximately that ratio.

A main object of the invention is to provide a plastic seat which has substantial thickness to attain abrasion resistance and long life, and yet which is so proportioned as to maintain substantial pressure-shut-off capability.

An object of the invention is to provide such a plastic seat which can be made to be removable from or integral with the valve body.

Another object of the invention is to provide a lined gate valve having an improved removable seat held in position by the pressure of contact of the pipe flange when the valve is connected in a pipe line.

A still further object of the invention is to provide a lined gate valve wherein portions of the line are exposed at the pipe flange faces of the valve body to provide seals with the adjacent pipe flanges.

A still further object of the invention is to provide a lined valve as just described having a seat receiving recess sufficiently greater in an axial direction than the comparable dimension of a removable seat so as to permit inward displacement of portions of the seat under pipe flange pressure, without resulting in unsymmetrical deformation of the seat when the pipe is clamped between pipe flanges in a pipeline.

Another object of the invention is to provide a gate valve of the type just recited having a plastic liner, wherein there is a metal rib in the body which projects into the liner to prevent pressure applied to the liner by a pipe flange from displacing the plastic liner material into interfering contact with the plastic seat, which would cause unsymmetrical distortion of the seat on closure of the gate.

BRIEF DESCRIPTION OF THE DRAWINGS

FIG. 1 is an elevational view of a valve embodying the concepts of the present invention taken from the upstream side thereof;

FIG. 2 is a sectional view taken through FIG. 1 along lines 2—2 of FIG. 1;

FIG. 3 is an enlarged fragmentary sectional view taken along lines 3—3 of FIG. 1;

DESCRIPTION OF THE PREFERRED EMBODIMENTS

Figure 4A:
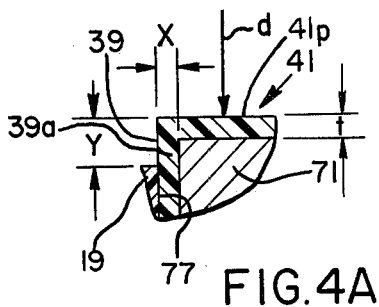
FIG. 4A is a view of a portion of FIG. 4.
Figure 4:
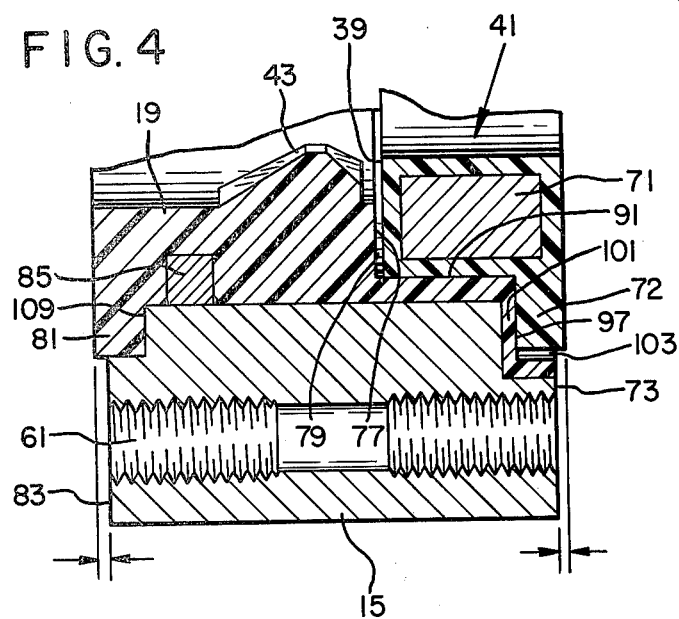
FIG. 4 is a view like FIG. 3 but with the pipe flanges removed.

FIGS. 1 through 4 show one preferred embodiment of the invention wherein the gate valve shown comprises a valve body made up of essentially two parts, an outer metal shell 11 and an inner plastic liner 13 bonded to the shell. The shell comprises a lower annular portion 15 and an upper chest portion 17. The liner has a similar lower annular portion 19 and an upper chest portion 21.

The plastic chest portion 21 is formed with a blade receiving slot 23 (FIG. 2) of generally rectangular horizontal cross section, slidably receiving a gate blade 25. A stuffing box 31 of more or less conventional form provides a seal between the blade and the upper portion of the valve chest. A blade actuating mechanism fragmentarily shown at 33, is supported by legs 35, and is of conventional form (being like that shown in the patent to Williams U.S. Pat. No. 3,164,363).

When the actuating mechanism is operated one way, the blade 25 is raised, and when it is operated the opposite way, the blade is lowered, so that its lower semi-circular end 37 (FIGS. 1 and 2) will fully seat against a seating face 39 provided by a seating portion 39a of removable seat 41. A pair of seat wedges 43 (FIGS. 1 and 2) formed on the annular portion 19 of the liner, engage the beveled edge 45 of the semi-circular end 37 of the gate blade as the gate blade moves to its final position, whereby the wedges cam the gate blade over firmly against the seating face 39 of the seat 41 in firm sealing contact therewith.

With the above arrangement, left hand side of the valve, as the parts are shown in FIGS. 2 and 3, is the upstream side of the valve, whereas the opposite side is the downstream side.

FIG. 2 shows the gate valve connected to a pipe line which has an upstream pipe flange 51 on a section of pipe 53, and a downstream pipe flange 55 on a section of pipe 57. Bolts 59 thread into threaded holes 61 provided on the metal shell 11 to firmly compress the flanges against the gate valve.

It is common practice when a steel valve is intended for use with abrasive slurries, to provide a plastic liner in the valve to enable the valve to handle such slurries without incurring the rapid wear that would otherwise occur if the steel were not protected by the liner. We were aware that the softer polyurethanes, say around 88 durometer (or between 83 and 93 durometer) resist wear better than harder ones. However, we found that under substantial pressure conditions, say 150 psi, the softer polyurethanes, not having the structural integrity of steel, undergo unsymmetrical distortion, so that effective shut off was not achieved.

We tried embedding in a plastic annular seat member, a metal ring, such a ring 71, but this seemed to yield inconsistent results depending on the proportions of the parts. At times the symmetrical deformation could be attained, but wear was excessive. In other proportions, the wear was acceptable but the deformation was unsymmetrical, or at least sufficiently unsymmetrical to result in unreliable shut-off conditions. Then, we discovered that for substantial pressure operations, in order to prevent unsymmetrical distortion of the seat and yet to attain maximum wearing characteristics, the seat had to be proportioned such that the ratio of the unit bearing stress to the unit shear stress equaled 0.68 or approximately that ratio. Greater ratios greatly reduced wear life, and smaller ratios made for larger parts which become uneconomic. While optimum results will not be obtained with variations from 0.68, acceptable but not optimum results can be obtained if the ratio is as small as 0.55 or as large as 0.80.

Referring to FIG. 4A, if "d" is the inner diameter of the seat, the following formula will give a ratio which should be 0.68 to give optimum results or can vary as above indicated to give acceptable results.

$$\frac{\text{Shear Area}}{\text{Bearing Area}} = \text{Ratio}$$
$$\frac{X(d + 2t)\pi}{[(d + 2y)^2 - d^2]\pi/4} = \text{Ratio}$$
$$\frac{X(d + 2t)4}{(d + 2y)^2 - d^2} = \text{Ratio}$$

The seating portion 39a is integrally joined to an annular flow passage portion 41p (FIG. 4A) which is angularly related to the seating portion. With the gate fully seated, and with full fluid pressure forcing the gate against the seat, opening movement of the gate is resisted because of its frictional engagement with the seating portion 39a. This resistance is substantial and tends to shear off the seat at a stress area comprising a "narrow band" of the seat material opposite the outer diameter of the flow passage portion 41p. This band is defined by the numerator of the above equations, having a diameter equal to the external diametrical dimension of the flow passage portion 41p and a width equal to the thickness of portion 39.

FIG. 2 shows that the removable seat provides a seal with the associated pipe flange 55. This is accomplished by providing a downstream flange 72 (FIG. 3) on the seat 41 which projects beyond the end surface 73 of the metal shell 15. However, the compressive force applied to the protruding portion of the seat by the pipe flange displaces the plastic material inwardly to distort the contact between the upstream face 39 of the seat and the mating face 77 (FIG. 3) of the liner 13. This prevents the gate blade from forming a proper seal with the seat face 39.

We discovered that this problem can be overcome by providing a gap 79 (FIG. 4) between the seating face 39 and the face 77 of the liner, and by dimensioning the seat so that the inward displacement of the seat, under the influence of pipe flange pressure, is approximately equal to the width of the gap. This eliminates the distorting contact pressure at the seat face 39 that otherwise would occur.

The annular portion 19 of the liner is also constructed so that is has sealing contact with the other pipe flange 51. This is done by providing a flange 81 which projects beyond the upstream surface 83 of the metal shell sufficiently so that when the pipe flange 51 is bolted onto the metal body, the pressure of contact between the pipe flange and the plastic flange 81 forms an effective seal.

To prevent the just recited contact pressure from displacing the plastic material of the liner inwardly an extent such as to apply unwanted pressure on the seat 41, an annular metal rib 85 is provided on the interior of the annular portion 15 of the metal shell of the valve. This precludes unwated inward displacement of the plastic material under the compressive force of the pipe flange 51. The rib can be welded to the metal shell (as shown) or formed as an integral part of the shell.

The seat 41 could be constructed slightly oversize so that it has a frictional fit within a recess 91 formed within the annular portion 19 of the liner. This would serve to retain the seat 41 in place during handling, shipping, etc., of the valve. However, a slip fit could be used if desired, with the provision of other means for retaining the seat in place during handling, etc.

It is pointed out that a seal is formed between the seat 41 and the liner 13 by the pressure of contact between the seat flange 72 and the opposing wall of a recess 97 formed in a flange 101 on the plastic liner. Thus, the compressive force applied by the pipe flange 55 to the pipe flange 72 forms a dual seal, the first being between the pipe flange and seat flange 72, while the second is between the seat flange 72 and the liner flange 101.

It is pointed out that a gap 103 provided between the exterior of the seat flange 72 and the curved wall of the recess 97 so that when end pressure is applied to the flange 72, the flange can distort radially without excessive interference with the curved wall of the recess 97. A similar gap could be provided between the flange 81 of the liner at the upstream face of the valve and the associated wall of the flange recess, but this is unnecessary because the flange 81, being bonded to the metal shell, is not permitted to distort radially any significant extent.

Note that since the seat 41 projects into the flow passage P formed in the liner 13, the seat can be readily slipped or popped out by removing the pipe 57 and its flange 55 and applying slight or forceful taps to the seat in a downstream direction depending on the fit of the seat within the liner, without having to remove the flange 51 and its pipe section 53.

Figure 5:
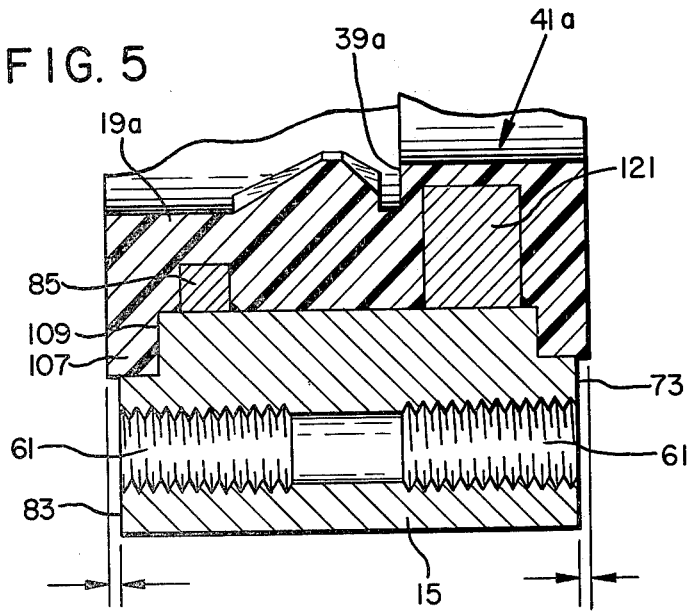
FIG. 5 is a view like FIG. 4 but showing an integral valve seat.

Another preferred embodiment of the invention is shown in FIG. 5 wherein the seat 41a, instead of being removable, is formed as an integral part of the liner portion 19a. With this construction there is no totally embedded ring 71 as in FIG. 1. Instead there is a rib 121 welded to or cast integrally with the metal shell portion 15. The seat is so proportioned that the unique ratio reflected by FIG. 4A is also present in seat 41a. Thus the seat will not undergo unsymmetrical distortion under shut-off conditions.

Armed with the teachings hereinbefore set forth, plastic linings can be tailored for different conditions. If the slurry is highly abrasive, but the pressure is low, the plastic can be made softer for greater resistance to abrasion, without the plastic undergoing unsymmetrical distortion. As the pressure increases, the durometer of the plastic should be increased in order to avoid unsymmetrical distortion.

While polyurethane is the specific plastic material which has been referred to in the specification, it is not intended to limit the term plastic to a polyurethane plastic because other plastics having similar characteristics could be utilized.

What is claimed is:

1. In a gate valve having a seat for engagement with a gate blade for shutting off flow through the valve, said seat including a plastic layer having a seating portion defining an annular face for engagement with the blade and having a flow passage portion angularly related and integrally joined to said seating portion, means defining a rigid back up structure for said layer, said seat having a shear area constituted by the area of a band having a diameter equal to that of the exterior of said flow passage portion and a width equal to the thickness of said seating portion, the ratio of said shear area to the area of said annular face being greater than 0.55 but less than 0.80.

2. A gate valve as described in claim 1, wherein the proportions of the plastic layer are such that the following formula gives a ratio of 0.55 to 0.80:

$$\frac{X(d + 2t)4}{(d + 2Y)^2 - d^2} = \text{Ratio}$$

wherein d is the inner diameter of said flow passage portion, X is the axial thickness of said seating portion, Y is the width of said annular face, and t is the radial thickness of said flow passage portion.

3. A gate valve as recited in claim 1 wherein said seat comprises an annular body of plastic material, and wherein said rigid back up structure comprises an annular metal band entirely embedded within said plastic body.

4. A gate valve as recited in claim 1 wherein said rigid back up structure comprises a metal rib on said body in contact with said layer.

5. In a gate valve having a valve body to receive a gate blade:

said body being formed with a seat receiving recess, said recess being defined in part by a downstream facing wall, said body having a flange-mounting face at its downstream side, a seat in the form of a ring having a radially outward extending compressible flange for contact, on one side, with said face in sealing contact therewith, and on its opposite side with a pipe flange in sealing contact therewith, said ring being seated in said recess and having an upstream face disposed in spaced relation from said downstream facing wall to leave a gap, said flange being compressed when the valve is bolted into a pipeline, by an amount not greatly in excess of the dimension of said gap, so that said upstream face of said seat is maintained in an undistorted condition.

6. In a gate valve as recited in claim 5, wherein said flange-mounting face constitutes the recessed side wall of a flange-receiving recess formed in said valve body, said flange having a thickness exceeding the depth of said flange-receiving recess so as to project therefrom for sealing contact with a pipe flange, said flange projecting from said flange-receiving recess by an amount not substantially greater than the width of said gap.

7. In a gate valve as recited in claim 6, wherein:

said body has a metal shell surrounding a plastic liner within which said seat receiving recess is formed, said metal shell having a flange-receiving recess formed therein at the upstream side of said valve body, said liner having a radial flange seated in the just-mentioned recess and being thicker than such recess for sealing engagement with a pipe flange, said shell having an interior rib projecting into said liner so that when said valve body is secured in a pipe line and compressive force is applied to said liner flange, said rib will prevent substantial reduction in the size of said gap because of such force.

8. In a gate valve having a valve body to receive a gate blade:

said body being formed with a seat receiving recess, said recess being defined in part by a downstream facing wall, said body having a flange-mounting face at its downstream side, said flange-mounting face constituting the recessed side wall of a flange-receiving recess formed in said valve body, a circular seat having a radially outward extending flange for contact, on one side, with said face in sealing contact therewith, and on its opposite side with a pipe flange in sealing contact therewith, said seat being seated in said recess and having an upstream face disposed in spaced relation from said downstream facing wall to leave a gap, said flange having a thickness exceeding the depth of said flange-receiving recess so as to project therefrom by an amount not substantially greater than the width of said gap, said flange being compressed when the valve is secured in a pipe line, by an amount not greatly in excess of the dimension of said gap, so that said upstream face of said seat is maintained in an undistorted condition, said body having a metal shell surrounding a plastic liner within which said seat receiving recess is formed, said metal shell having a flange-receiving recess formed therein at the upstream side of said valve body, said liner hving a radial flange seated in the just-mentioned recess and being thicker than such recess for sealing engagement with a pipe flange, said shell having an interior rib projecting into said liner upstream from said gate blade so that when said valve body is secured in a pipe line and compressive force is applied to said liner flange, said rib will prevent substantial reduction in the size of said gap because of such force, said seat including a plastic layer defining an annular face for engagement with said blade, means defining a rigid back up structure for said layer, the ratio of (a) the thickness of said layer from said annular face to said back up structure, to (b) the width of said annular face being greater than 0.55 but not more than 0.80.

* * * * *